United States Patent [19]

Brandenstein et al.

[11] Patent Number: 4,878,885

[45] Date of Patent: Nov. 7, 1989

[54] TENSION ARRANGEMENT FOR TRANSMISSION BELTS

[75] Inventors: Manfred Brandenstein, Eussenheim; Jurgen Kober, Schwebeim, both of Fed. Rep. of Germany

[73] Assignee: SKF GmbH, Schweinfurt, Fed. Rep. of Germany

[21] Appl. No.: 155,261

[22] Filed: Feb. 12, 1988

[30] Foreign Application Priority Data

Feb. 13, 1987 [DE] Fed. Rep. of Germany ....... 3704521

[51] Int. Cl.$^4$ .............................................. F16H 7/08
[52] U.S. Cl. .................................................. 474/135
[58] Field of Search ............... 474/101, 109, 111, 113, 474/114, 115, 117, 133, 135, 136, 138

[56] References Cited

U.S. PATENT DOCUMENTS

| | | | |
|---|---|---|---|
| 4,473,362 | 9/1984 | Thomey et al. | 474/135 |
| 4,543,571 | 9/1985 | Billbrey | 340/710 |
| 4,546,347 | 10/1985 | Kirsch | 340/710 |
| 4,557,707 | 12/1985 | Thomey | 474/101 |
| 4,583,962 | 4/1986 | Bytzek et al. | 474/135 X |
| 4,698,049 | 10/1987 | Bytzek et al. | 474/135 |

*Primary Examiner*—Thuy M. Bui
*Attorney, Agent, or Firm*—Rosen, Dainow & Jacobs

[57] ABSTRACT

In a spring biased tension arrangement for transmission belts, a friction element is installed coaxial with respect to the pivot bearing. The friction element provides a turning direction dependent damping of the pivot arm. It may be disc or sleeve shaped and is inserted in an annular space to contact a limit surface with rubbing contact. Tongues or spoke elements, inclined to the turning direction, have inclinations dependent more or less elastically upon the turning direction and act for example to change the overall height or thickness of the friction element and therewith an increase of the friction force. The tongues or spoke elements can be connected with a separate spring or formed as a unit with the friction element.

7 Claims, 3 Drawing Sheets

TENSION ARRANGEMENT FOR TRANSMISSION BELTS

BACKGROUND OF THE INVENTION

This invention relates to a tensioning arrangement for transmission belts.

One tension arrangement of this type is disclosed in U.S. Pat. No. 4,557,707. This reference discloses a tension roller mounted at one end of the pivot arm with the pivot arm rotatably mounted on a flange affixed to a motor block. The tension of the roller against the transmission belt is adjusted by a torsion spring. An annular space is defined by an annular side surface of the pivot arm and the flange, and a friction element is positioned in the annular space. The side surface of the friction element is a friction surface that contacts the annular side surface of the pivot arm with rubbing contact. The friction surface extends over the whole circumference of the friction element and ensures a uniform support and a minimal constant displacement. Pivot movement of the pivot arm which is caused by vibration of the transmission belt or by impulse shock acting opposite the tension direction is damped by energy loss by the friction element. An equivalent action can be produced by the cylindrical friction surface of a similar friction element, if corresponding bore or outer surfaces are provided on the pivot arm and on a fixed part. A difference exists, however, between the above mentioned vibration and the impulse shock in the pivot direction. While the vibration oscillates mostly with higher frequencies and in a relataively small angular region, impulse shock occurs sporadically and effects a pivotal movement in a larger angular region. In the above described tension arrangement, both of these known influences are damped in the same manner, whereby in critical situations the transmission belt can completely lift off from the tension roller. In this case the tension arrangement returns too slowly in the tension direction after greater excursions resulting from an impulse shock opposite the tension direction, as a result of stronger damping. While arrangements are specifically provided which produce a damping force that is dependent upon the pivot position, these arrangements have no influence on above discussed detrimental action.

SUMMARY OF THE INVENTION

The invention is therefore directed to the provision of a tension arrangement of the above type in which a friction element is provided whose damping characteristics, especially in response to impulse shock, reliably inhibit the lifting up of the tension roller from the transmission belt.

This object is solved in accordance with the invention by the provision of a friction element that has a given prestress against the respective machine part in one turning direction, and a higher prestress in the other turning direction.

As a result, a damping is provided that is dependent upon the turning direction. Vibration of the transmission belt, which is produced, for example, as a result of the firing order of the combustion engine, or the reaction of the valve springs on the cam shaft, is in the form of relatively high frequency oscillations with minimum amplitude on the tension roller, the tension roller converting these oscillates via the pivot arm and the pivot bearing into corresponding oscillating pivot movements of the whole tension arrangement. The friction element according to the invention will greatly reduce the amplitude of these oscillations, or completely stop them, with minimum damping force energy loss damping. These oscillations occur mostly in a very narrow resonance region of the whole pivoting system, and the torsion spring of the tension arrangement also contributes to the oscillations. A longer effective damping force over several swinging amplitudes is necessary, in general, for these high frequency oscillations, in the sense of an asymptotic damping, so that at least one half swing opposite the tension direction passes, until the swinging comes to a standstill. As already mentioned, however, a sufficiently good damping can be attained with a relatively minimum damping force.

Furthermore impulse shocks occur sporadically and in nearly all cases only in one swinging direction, either opposite to or in the direction of the tension force. They arise from suddenly occurring turning moments owing to energy loss of the generator, in the connection of large consuming devices, or due to similar effects in the compressor, vacuum pump or connectable ventilators or from the drive of the motor in the gear box, or due to chuck holes and so forth. The above mentioned impulse shocks have steeply rising flanks, and high amplitudes, which cause the pivoting of the tension arrangement about large angle steps due to an extremely strong force influence going out from the transmission belt. If the impulse shock follows immediately in the direction opposite the tension direction, the arrangement according to the invention acts and the friction element effects an immediate oppositely acting increased damping force, which considerably reduces the amplitude of the impulse shock. After the passing of the amplitude peak the tension force outgoing from the torsion spring causes an immediate adjustment of the tension roller against the transmission belt and therewith in the direction with the minimum damping force through the friction element.

If the impulse shocks occur first in the turning direction, when using a very stretchable transmission belt, the tension roller can advantageously rapidly cause a tension regulation of the belt due to the reduced damping force in this direction. The descending flank of the impulse shock will thereupon and in this case no longer be damped with increased force in the direction opposite the tension direction.

In the above described manner, using the tension arrangement according to the invention, on the one hand quieter running of the transmission belt will result, and on the other hand an immediate reverse to normal characteristics will be produced in the event of unavoidable impulse shocks. It is reliably ensured that the lifting of the tension roller from the transmission belt will not occur.

According to a further feature of the invention the friction element is provided with a separate spring force pressing against the other limit surface of the annular space, and with arrangements for changing its overall height between the limit surfaces of the annular space outwardly from the base part, in one of the directions of pivot movement. Thereby the friction element is forced against one of the limit surfaces by a separate spring or for example through the inherent material elasticity, whereby the support on the other limit surface or the like follows. Thereby a predetermined friction force between the friction element and the respective limit surface is realized that is independent of tolerance errors of the separate components. Furthermore arrangements are provided, which increase or decrease the overall height of the friction element or the combination of the friction element and spring. While in one turning direction the discussed damping is produced by the spring action, in the other turning direction the overall height increases for example and thereby causes an increased friction force and resulting greater damping. This can be effected for example by an element that spreads in dependence upon the turning direction.

Alternatively, in accordance with another embodiment of the invention, an arrangement can be provided which increases or decreases the spring force. In this arrangement also the damping force can be changed in dependence on the turning direction.

BRIEF DESCRIPTION OF THE DRAWINGS

In order that the invention may be more clearly understood, it will now be disclosed in greater detail with reference to the accompanying drawings, wherein.

DETAIILED DISCLOSURE OF THE INVENTION

Figure 1:
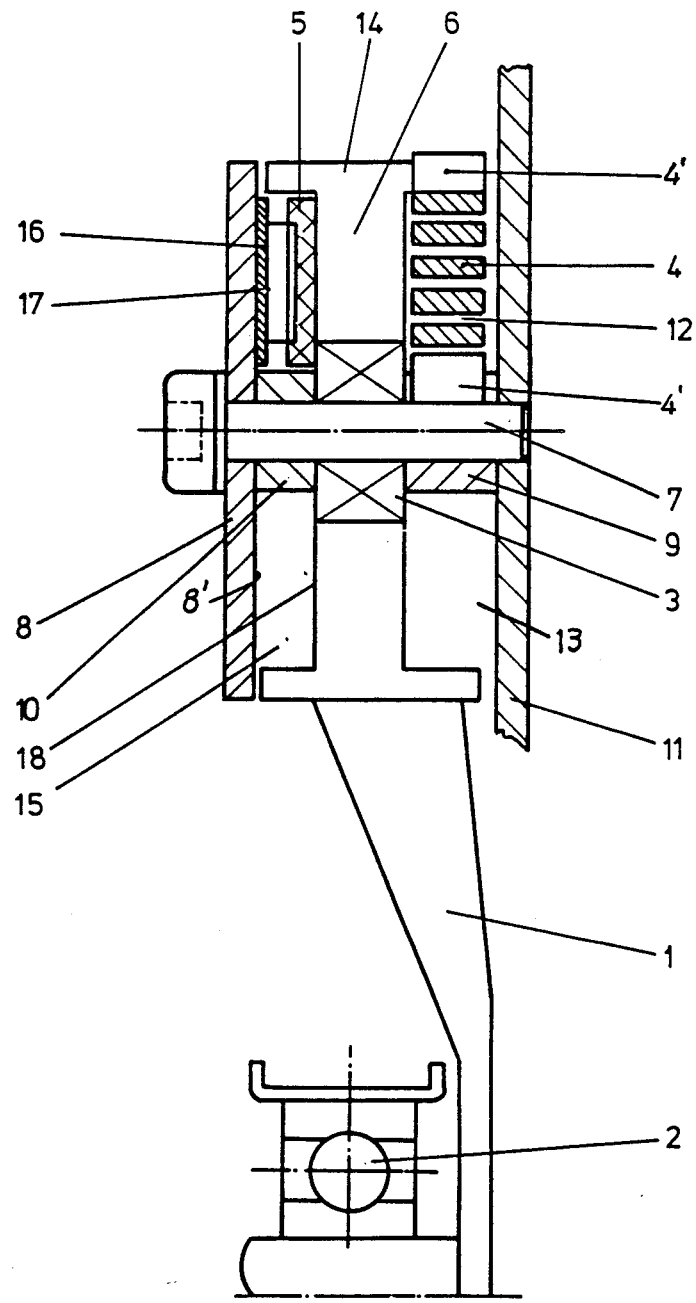
FIG. 1 is a longitudinal cross sectional view of a portion of a pivot movement direction dependent tension arrangement in accordance with the invention, with a disc shaped friction element.

The tension arrangement illustrated in FIG. 1 is comprised essentially of pivot arm 1, a tension roller 2 mounted on one end of the pivot arm 1 for guiding and tensioning a transmission belt (not illustrated), a pivot bearing 3 on the other end of the pivot arm with a torsion spring 4 coaxially arranged with respect thereto, and a friction element 5 for damping swinging motion. The two sides of this end of the pivot arm 1 are provided with cup shaped recesses 13,15. The rolling or sliding bearing 3 is mounted in the bottom section 6 of the pivot arm intermediate the cup shaped recesses, the illustrated rolling bearing being held to a support 11 by a screw 7 that extends through a cover piece 8, a spacer 10, the bearing 3 and a spacer 9, into the support 11 such as a machine frame, or directly on a motor block (not shown). A torsion spring 4, for example a spiral spring of strip material, only the upper half of which is illustrated, is arranged in the inner annular space 12 between the bottom section 6 and the support 11. The inner and outer free ends 4' of the spring 4 are bent to extend radially inwardly and outwardly, respectively, to be anchored in slits in the inner spacer 9 and the end 14 of the pivot arm 1 is thereby subject to a turning moment and applies a tension force to the transmission belt by way of the tension roller. A disc shaped friction element 5 is arranged in the outer annular space 15, the disc being pressed by a plate spring 16 and notched fingers 17 against the side surface 18 of the bottom section 6. Only the upper part of the spring 16 is shown in FIG. 1. The plate spring 16 is mounted by conventional means, although not specifically shown, so that it does not rotate with respect to the cover 8.

Figure 3:
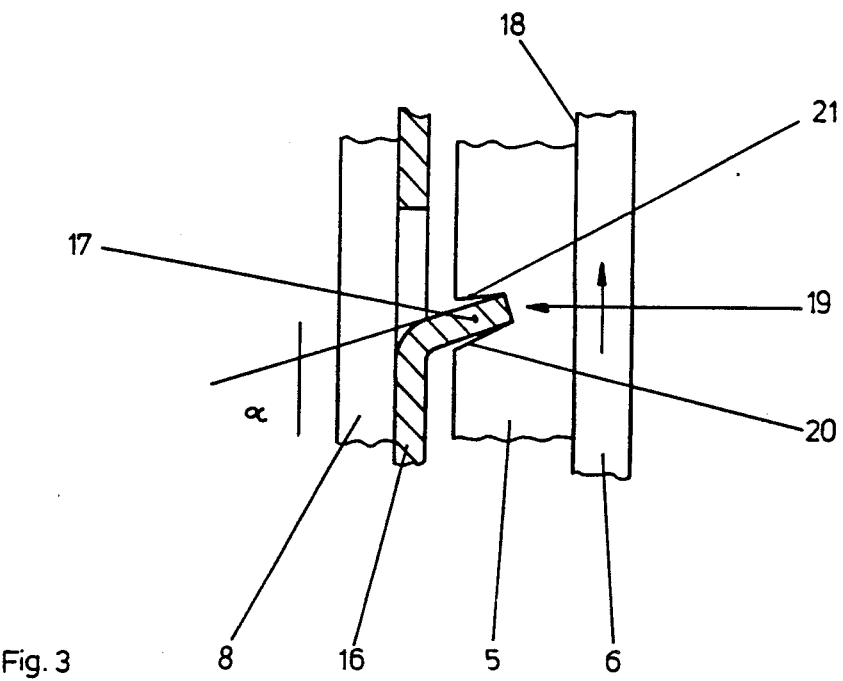
FIG. 3 is an enlarged cross sectional view of portion of the tension arrangement of FIG. 1, taken in a plane perpendicular to the axis of the screw and extending though the friction element.

The manner of operation of the direction of pivot movement dependent damping is better explained with reference to the enlarged partial longitudinal section of FIG. 3. The above mentioned circumferentially distributed radially extending tongues 17 are notched out of the plate spring 16 and bent at an angle of from 50 to 85 degrees, prefereably about 80 degrees, to the turning direction. They extend into substantially V-shaped recesses 19 of the friction element 5. The side walls 20,21 of the V-shaped recesses 19 are at angles corresponding to the inclination of the tongues 17 at their extreme positions and thus form a limit for the inclination of the tongues within the elastic region thereof. A change of the inclination of the tongues 17 results from turning of the pivot arm 1 due to the rubbing of the friction element 5 on the side surface 18 of the bottom section 6. Upon pivoting of the arm 1 in the direction indicated by the arrow, the inclination of the tongues 17 is reduced and is accordingly limited by the lower side 20 of the V-shaped recess illustrated in FIG. 3. The friction in this direction of pivot movement causes an energy dissipating damping of the pivot movement that is a function of the tension of the belt. The inclination of the tongues 17 with respect to the direction of pivot movement is increased upon the reverse pivot movement. It causes a spreading effect, i.e. an effective "thickening" of the plate spring, by which the friction element 5 is forced more strongly against the side surface 18 of the bottom section 6. This produces a greater damping of the pivot movement, the exteme value being limited by the arrangement of the tongues 17 on the upper sides 21 of the V-shaped recess 19 illustrated in FIG. 3. In order to insure a positive limiting in both of the above mentioned directions, the recesses 19 are preferably sufficiently deep to effect this result.

Figure 2:
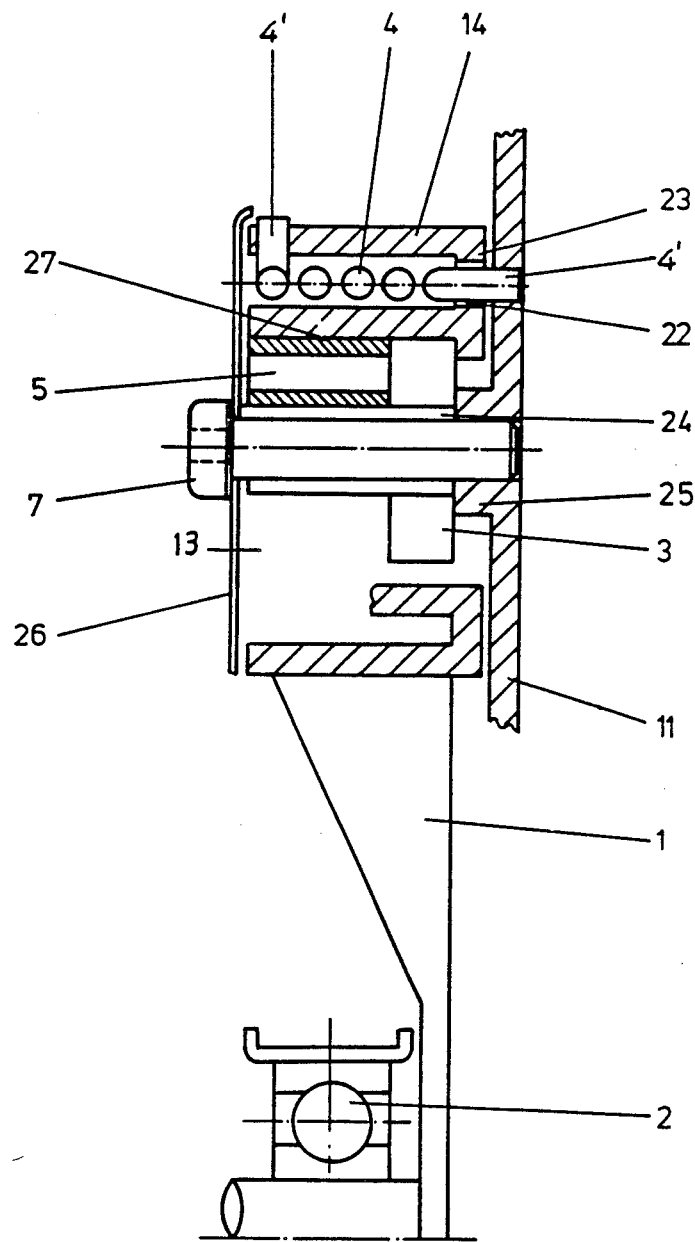
FIG. 2 is a longitudinal cross sectional view of a portion of a tension arrangement dependent upon the pivot movement direction, with a sleeve shaped friction element.

The tension arrangement illustrated in FIG. 2 has substantially the same effect as described with reference to the embodiment of FIG. 1. The torsion spring 4 and friction element 5 of the embodiment of FIG. 2 differ from the respective elements shown in FIG. 1. The torsion spring 4 in the embodiment of FIG. 2 is a helical spring (only the upper part of which is illustrated in FIG. 2) and is positioned in a radially outer annular space of the pivot arm 1, this outer annular space being open at the axially outer side of the arm and having a closed bottom 23 at the other axial side of the arm. One free end 13 of the spring 4 is anchored in the outer surface 14 of the pivot arm 1 and the other free end anchored in a bore in the support 11, extending thereto by way of a slot 22 provided in the bottom 23 of the outer annular space. The rolling or friction bearing 3 is mounted in an inner cup shaped recess of the pivot arm 1, the inner ring of the bearing being fitted over an inner spacing sleeve 24 and axially engaging the end of internally threaded support ring 25 connected to the support 11. The spacing sleeve 24 is fastened to the support 11 by a screw 7 extending through a sheet metal cover 26 and the sleeve 24 and into the internally threaded support ring 25. A sleeve shaped friction element 5, only the upper half of which is illustrated, is inserted in the inner recess with the inside of the friction element 5 being affixed to the spacing sleeve 24 by conventional techniques to avoid relative rotation therebetween. The outer side of the friction element 5 is in friction contact with the outer bore surface 27 of the inner recess in order to provide damping of the pivot movement.

Figure 4:
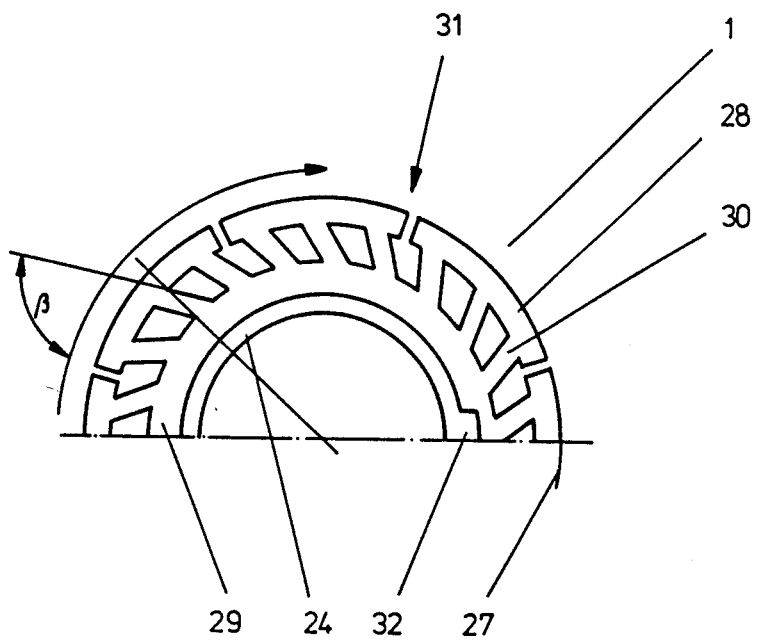
FIG. 4 is an enlarged end view of a portion of the friction element of FIG. 2.

FIG. 4 shows the above discussed sleeve shaped friction element 5 of FIG. 2. It consists substantially of coaxial radially spaced apart outer and inner sleeves 28,29 interconnected by spoke webs 30. The friction element 5 is preferably a unitary component of plastic material. The spoke webs 30 are inclined at an angle of about 80 degrees to the direction of pivot movement indicated by the arrow. In this direction of pivot movement the spoke webs raise themselves in the sense of tending to have an increased inclination, to thereby tend to increase the wall thickness of the sleeve 5. The prestress of the outer sleeve 28 against the bore surface 27 of the pivot arm is increased in this manner, so that a greater friction force and a consequent increased damping force is produced. In the reverse pivotal direction of the pivot arm the turning moment causes a reduced inclination of the spoke webs, so that the wall thickness of the sleeve 5 is ostensibly reduced. A minimum friction or damping force is provided in this manner. In order to ensure the adaptation of the outer sleeve 28 to the bore surface 27 at different circumferential regions, the outer sleeve 28 is separated into part sections by axially extending slits 31. The inner sleeve 29 is provided with an axially extending groove which is interlocked with a corresponding projection 32 of the spacing sleeve 24 to prevent relative rotation therebetween.

While the invention has been disclosed and described with reference to a limited number of examples, it is obvious that variations and modifications may be made therein. Thus, the illustrated friction elements are only examples. Obviously other embodiments, which result for example in a modification of the overall height, the spring force, etc, can be used. It is therefore intended in the following claims to cover each such variation and modification as falls within the true spirit and scope of the invention.

What is claimed is:

1. In a tension arrangement for transmission belts, including a pivot arm, a tension roller mounted at one end of the pivot arm, a pivot bearing mounted at the other end of the pivot arm, a torsion spring coaxial to the pivot bearing and mounted to act between the pivot arm and a fixed machine part, and a pivot movement damping friction element having friction surfaces extending substantially over its entire circumference and inserted in an annular space bounded by opposite surfaces the improvement comprising; means for prestressing the friction element between said opposite surfaces with a first amplitude of force in one direction of pivot movement of the arm and for prestressing said friction element with a second amplitude of force greater than said first amplitude in the other direction of pivot movement of the arm.

2. The tension arrangement of claim 1 wherein the friction element is provided with a separate spring means connected to one of the opposite surfaces of the annular space, and having means for changing the force of the friction element between the opposite surfaces of the annular space from its initial condition outwardly in one of the pivot turning direction.

3. The tension arrangement of claim 2 comprising means for adjusting the force of the spring means in one pivot turning direction.

4. The tension arrangement according to claim 1 wherein tongues are provided bent out from the side of the spring means facing the friction surfaces of the friction element, the tongues being inclined at an angle of from 50 to 85 degrees to the pivot movement direction, the tongues being elastically bendably movable and being supported on one of the opposite surfaces of the annular space.

5. The tension arrangement of claim 1 wherein the friction element is disc shaped and has axially bent out tongues.

6. The tension arrangement of claim 1 wherein the friction element is sleeve shaped and has radially bent out tongues.

7. The tension arrangement of claim 1, wherein the friction element is comprised of two coaxial radially spaced apart sleeves interconnected by spoke webs inclined at angle of from 50 to 85 degrees to the movement direction.

* * * * *